United States Patent [19]

Panosh

[11] Patent Number: 5,559,874
[45] Date of Patent: Sep. 24, 1996

[54] TELEPHONE SERVICE PROTECTION DEVICE

[76] Inventor: Richard Panosh, 101 S. Canyon, Bolingbrook, Ill. 60440

[21] Appl. No.: 402,944

[22] Filed: Mar. 13, 1995

[51] Int. Cl.$^6$ .................................................. H04M 1/66
[52] U.S. Cl. ........................... 379/189; 379/199; 379/200
[58] Field of Search ...................................... 379/188, 189, 379/190, 199, 200, 201, 7

[56] References Cited

U.S. PATENT DOCUMENTS

| 4,885,768 | 12/1989 | Genin | 379/188 X |
| 4,953,202 | 8/1990 | Newell | 379/189 X |

FOREIGN PATENT DOCUMENTS

| 239455A | 9/1987 | European Pat. Off. | 379/188 |

*Primary Examiner*—Ahmad F. Matar
*Attorney, Agent, or Firm*—Patnaude, Videbeck & Marsh

[57] ABSTRACT

A device is provided to prevent an unauthorized telephone unit from initiating a telephone call, where the unauthorized telephone unit is connected between the central office of the telephone company and the authorized telephone units of the user. The device includes a first detector for detecting a DC current within the lines, and a second detector for detecting the voltage across the lines which lead from the telephone office to the authorized phones. A third detector detects a dual tone multifrequency dialing signal on the line, and a fourth detector detects pulse dialing, and a logic is responsive to all four detectors. When a dialing attempt is made from an unauthorized telephone unit, the first detector will not detect a DC current in the lines to the authorized telephone units, the second detector will detect a drop in voltage across the ring and tip lines, and either the third or fourth detector will detect that a dialing effort is being made. Where an unauthorized dialing is detected, the logic switches a blocking device between the lines to block the unauthorized dialing efforts.

14 Claims, 2 Drawing Sheets

TELEPHONE SERVICE PROTECTION DEVICE

The present invention relates to a device to prevent the unauthorized use of a telephone system, and in particular a device which can be activated by the authorized user of a telephone service to prevent pirating of the service between the authorized telephone units and the off premises telephone central office.

BACKGROUND OF THE INVENTION

It has become recognized that telephone service is a target of theft. If a telephone line is infrequently used, a thief can attach an unauthorized telephone receiver between the ring and tip lines which extend between an off premises telephone central office and the premises of a telephone user. Thereafter the thief can make use of the stolen telephone line at will. When an authorized telephone handset is put in use, the thief can terminate any call in process and reinitiate it after the authorized user has completed his call. Typically, when the authorized user finds an unauthorized party on his line, he assumes that it is the result of a temporary malfunction of equipment in the central telephone office, and it is not until he receives the next monthly bill that he learns of the theft. In the meantime, the thief will disconnect the intruding telephone unit before its point of attachment can be found.

Existing methods to prevent such theft generally do not protect the most vulnerable portions of the telephone circuit. For example, Perry, U.S. Pat. No. 5,086,459 is directed to an alternate wiring of a telephone interface which would prevent a theft of service by one who is not familiar with the wiring of Perry and attempts to attach an illegal telephone unit to the subscriber's interface. In Wright, U.S. Pat. No. 5,003,586 a protective device is also incorporated into the telephone interface. In Wright, the black and yellow, alternate wires of a RJ11 plug from an authorized telephone system are connected together, and the joined black and yellow wires from the authorized telephone unit will short out an interrupting circuit in the interface thereby permitting use of the telephone service system. Where the theft of the telephone service occurs between the interface and the telephone central office, however, the device of neither Wright nor Perry will provide the protection needed.

Genin, U.S. Pat. No. 4,885,768 discloses a device which is attached between the ring and tip lines of a telephone line and detects a change in the voltage between the lines. The device of Genin is connected to an active dipole filter to prohibit either a pulse dialing, or dual tone multi frequency dialing. The device, however, is deactivated when it recognizes a code inserted by an authorized user. Although the device of Genin will prevent an unauthorized user from initiating a telephone call, a user of an authorized telephone can not initiate a call without first inserting the code, which is an inconvenience to the user of an authorized telephone unit. Furthermore, the device of Genin can be avoided by an unauthorized user who somehow acquires the code. Newell, U.S. Pat. No. 4,953,202 discloses a device similar to Genin, and also requires the use of a code.

None of the existing devices, therefore, prohibit the use of an unauthorized telephone unit between the source of an off premises telephone central office and the authorized telephone units without requiring the use of codes such as disclosed by Newell and Genin.

SUMMARY OF THE INVENTION

Briefly, the present invention is a device for preventing the use of an unauthorized telephone unit which is connected between the central office of the telephone company and the authorized telephone units from initiating a telephone call.

The device has first and second connections for attaching the device to the ring and tip lines leading from a central office of a telephone system, and third and fourth connections for attaching to the ring and tip lines leading to the authorized telephone units. Within the device is a circuit which is transparent to signals between the authorized telephone unit and the central office providing telephone service. The circuit includes, a first detector for detecting a DC current in either the ring or tip lines, and a second detector for detecting a change in the voltage across the ring and tip lines leading from a central office of the telephone system.

In addition to the detection devices, the present invention further includes a passive pulse dialing blocking device, such as a resistor, and a passive dual tone multi-frequency dialing blocking device, such as a capacitor, and a switching system for connecting and disconnecting the blocking devices into the circuit between the ring and tip line connected to the central office of a telephone system.

In accordance with the present invention, a logic circuit is responsive to the first and second detectors and operates the switches to insert the blocking devices between the ring and tip lines when the first detector does not detect a DC current passing to the authorized telephone units, and a second detector detects a drop in voltage indicating that an unauthorized telephone unit is on line and attempting to dial a number.

In the preferred embodiment, the logic circuit is also responsive to a third detector for detecting a dual tone multi-frequency dialing signal. This detector is responsive within twenty milliseconds after a user initiates a dual tone multi-frequency dialing, such that the associated blocking device can be connected between the lines prior to the time needed for the central telephone office to recognize a dual tone multi-frequency dialing signal. A telephone central office usually requires forty milliseconds to interpret a dual tone multi-frequency dialing signal. The device also includes means for detecting a pulse dialing, and the logic inserts the blocking devices between the lines only when a dialing attempt is detected from an unauthorized telephone unit.

Another feature of the present invention is that the logic includes a timer for connecting the blocking devices between the ring and tip lines for a short period of time, such as one half second. As a result, when the device detects a dialing attempt from an unauthorized telephone unit, whether it is pulse dialing or dual tone multi-frequency dialing, the blocking device will be connected between the ring and tip lines for a half second thereby preventing the transmittal of a comprehendible dialing message to the telephone central office. At the expiration of the one half second, the blocking devices are removed from the circuit, such that the detectors can further monitor the line. If the unauthorized dialing is still in process, the logic device will again activate the switch and reinsert the blocking devices into the circuit. Where there is a dual tone multi-frequency unauthorized dialing, the device will insert the blocking capacitor after twenty milliseconds, which is not sufficiently long for the central office telephone service to interpret the tones being transmitted. Similarly, the logic circuit will detect changes in voltages spaced at intervals of a tenth of a second or less which is indicative of an unauthorized pulse dialing and switch the resistor between the ring and tip lines for one half second intervals. Pulses that do reach the central office will be spaced one half second apart, and will not constitute a comprehendible message. In the preferred embodiment, the logic circuit can also display a green light to indicate that the telephone line is in use, and a red warning light to indicate that a dialing has been attempted from an unauthorized telephone unit.

It should be appreciated that the present invention will not be perceived as being invasive by a telephone company central office. Specifically, it does not generate an invasive signal, such as a square wave inserted on the line to disrupt an unauthorized dialing or a short across the ring and tip lines, either of which may cause problems within the central office of a telephone system. Also, the device will not place the blocking devices across the lines except when an unauthorized dialing effort is attempted, and therefore the blocking devices will not interfere with routine testing of the lines from the telephone central office.

GENERAL DESCRIPTION OF THE DRAWINGS

A better understanding of the present invention will be had by a reference of the following detailed description taken in conjunction with the accompanying drawings wherein;

FIG. 1 is a block diagram showing the position of the present invention in a telephone circuit; and FIG. 2 is a block diagram of the circuit of the present invention.

DETAILED DESCRIPTION OF THE PREFERRED EMBODIMENT

Figure 1:
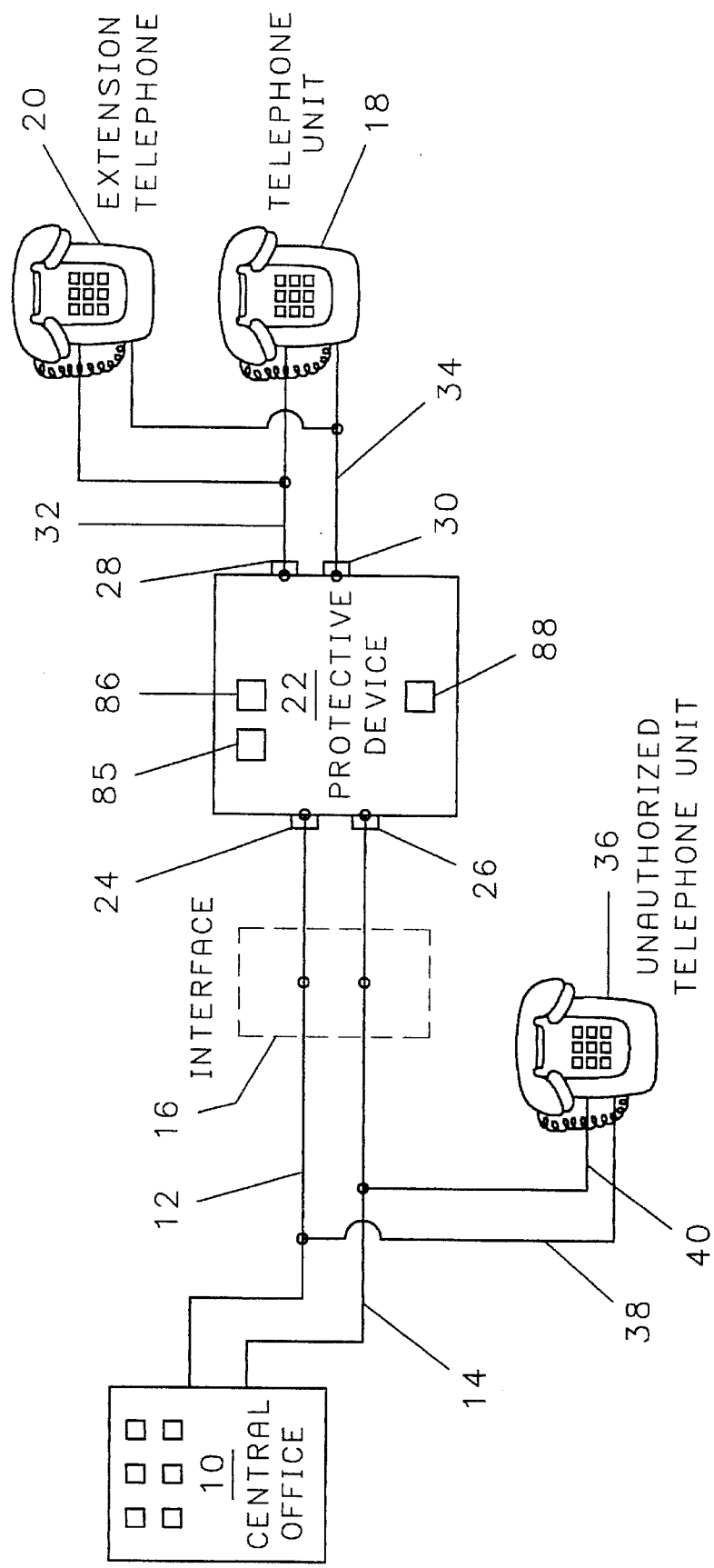

Referring to FIG. 1, telephone service is provided from a central office 10 of a telephone system, and extending from the central office are a plurality of telephone cables each of which includes a ring line 12 and a tip line 14. The ring and tip lines 12,14 pass through an interface 16 which is usually positioned on an outer wall of the property of a user. The equipment downline of the interface 16 is under the control of the end user who typically has a main telephone unit 18 and one or more extensions 20.

Positioned down line from the interface 16, and prior to the telephone unit 18 and extensions 20 is a protection device 22 in accordance with the present invention. The device has a first connector 24 and a second connector 26 for attachment to the ring and tip line 12,14 respectively extending from the central office 10. Generally, the first and second connectors are both incorporated into a female RJ11 connector for receiving a male RJ11 connector attached to the ring and tip lines 12,14 respectively from the interface 16. The device 22 further has a third connector 28 and a fourth connector 30 for connecting to the ring line 32 and the tip line 34 to the authorized telephone units 18,20. Like the first and second connectors 24,26, the third and fourth connectors 28,30 are incorporated into a female RJ11 connector such that a line having male RJ11 connectors at each end can be attached between the device 22 and the telephone units 18,20.

The present invention protects against an invasion of the telephone circuit by an illegal telephone 36 having a ring line 38 and a tip line 40 which connect to the ring and tip lines 12,14 which extend between the central office 10 and the interface 16.

Figure 2:
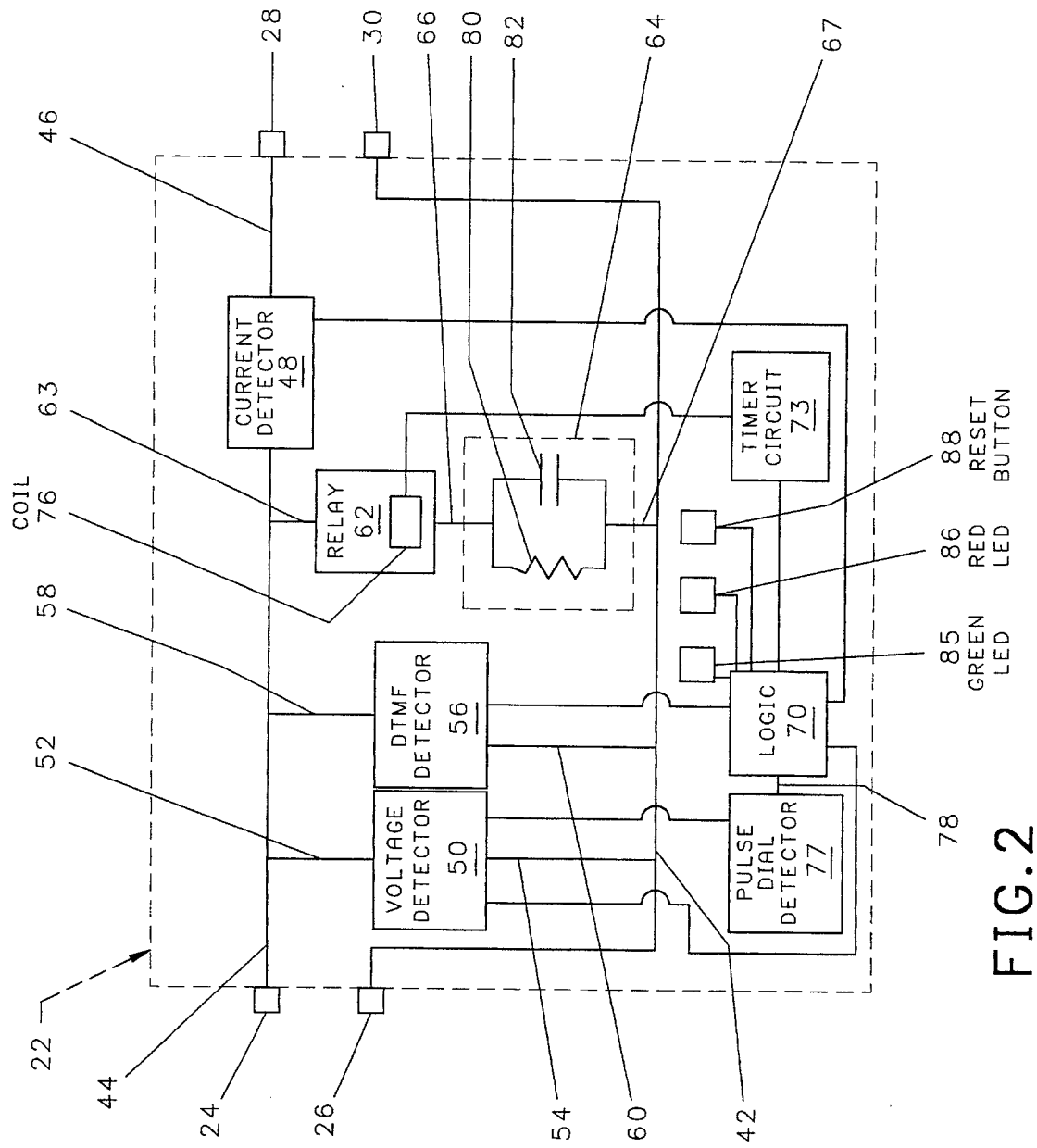

Referring to FIG. 2, the circuit within the device 22 includes a line 42 extending from the second connector 26 to the fourth connector 30 such that the tip line 14 extending into the device 22 from the central office 10 is directly wired to the tip line 34 to the authorized telephone units 18,20. Positioned in series between the first connector 24 and the third connector 28 by lines 44 and 46 respectively is a first detector 48 which detects the flow of current through the ring line with a minimal alteration of the impendence of the line.

A second detector 50 is attached parallel to the telephone units 18,20 by line 52 extending between the second detector 50 and the first connector 24, and line 54 extending between the second detector 50 and the second connector 26. The second detector 50 detects a change in voltage between the ring and tip lines 12,14 which is indicative of a telephone receiver being taken off hook. The voltage across the ring and tip lines is typically about 48 volts when the telephone units are on hook, and less than 18 volts when one of the telephone units is off hook.

A third detector 56 which detects the presence of a dual tone multi-frequency dialing on the lines 14,16 is also connected in parallel across the first and second connector 24,26 by lines 58,60 respectively.

A relay 62 is connected in series by line 63 with a passive low pass filter 64, and the relay 62 and filter 64 are also attached in parallel across the first and second connectors 24,26 respectively by lines 66 and 67 respectively.

The device has a logic circuit 70, which may be a hard wired circuit or software in a computer chip which receives input from the first, second and third detectors 48,50,56 respectively. The logic circuit 70 is also connected to a timer circuit 73 or clock which generates a pulse of current for a fixed time, and in the preferred embodiment, each pulse lasts one half second. The output pulse 74 of the timer circuit 73 energizes the coil 76 of the relay 62 thereby switching the low pass filter 64 in parallel across the ring and tip lines 12,14.

A pulse dialing detector 77 is also attached to the second detector 50 for recognizing a series of voltage changes across the ring and tip lines 12,14 as a pulse dialing. When the pulse dialing detector 77 determines that voltage changes are within 50 to 100 milliseconds of each other, which would be indicative of a pulse dialing, a signal 78 is sent to the logic circuit 70.

The low pass filter 64 includes a resistor 80 in parallel with a capacitor 82. In the preferred embodiment the resistor 80 may be 330 ohms and the capacitor 82 may be 100 micro farads. Accordingly, when the low pass filter 64 is connected in parallel across the ring and tip lines by the relay 62 the resistor 80 will conduct current between the lines such that pulse dialing from any telephone unit on line will be inhibited. Similarly, when the capacitor 82 is connected by the relay 62 in parallel between the ring and tip lines 14,16, the capacitor 82 will attenuate the high frequency tones of any dual tone multi-frequency dialing, thereby rendering the dialing effort incomprehensible by the telephone companies central office.

When a telephone handset is taken off hook, the second detector 50 will detect a drop in voltage across the first and second connectors 24,26 corresponding to the ring and tip lines 12,14. If the handset which is taken off hook is from one of the authorized units 18,20, the first detector 48 will also detect the current flow in the ring line, and the logic circuit 70 will not signal the timer circuit 73 to generate a pulse when it detects this combination of signals from the first and second detectors 48,50. The device will therefore be transparent to dialing from authorized telephone units 18,20.

On the other hand, when the handset of an illegal telephone 36 is taken off hook, the first detector 48 will not detect the flow of current but the second detector 50 will detect a drop in voltage across the ring and tip lines. When the logic circuit 70 detects an illegal telephone unit 36 being off hook, and subsequently, the pulse dialing detector 77 determines that pulse dialing is being attempted, or the third detector 56 determines that dual tone multi-frequency dialing is being attempted, the logic 70 will signal the timer circuit 73 to generate a one half second pulse to energize the coil 76 and connect the filter 64 in parallel across the ring and tip lines, thereby interrupting the dialing effort. After the pulse from the timer circuit 73 is terminated, the relay 62 will disconnect the filter 64 from the circuit and the detectors 48,50,56,77 will again monitor the lines 14,16. In the event the detectors 48,50,56,77 again provide inputs to the logic circuit 70 indicative of a dialing effort from an illegal telephone unit 36, the logic 70 will again signal the timer circuit 73 to generate a pulse to connect the filter 64 in parallel across the ring and tip lines 14, 16.

The logic circuit 70 is capable of responding to an illegal dialing attempt as determined by the pulse dialing detector 77, or the third detector 56 within 20 milliseconds and therefore, the dialing attempt by an illegal telephone unit 36 will cause the filter 64 to be connected between the ring and tip lines 14,16 for one half second intervals which are spaced approximately 20 milliseconds apart.

The preferred embodiment, further includes as outputs, a green light 85 indicative of the use of an the telephone line 12,14 and a red light 86 indicating that the filter 64 has been switched into the circuit to interrupt an illegal dialing attempt. A reset button 88 allows the resetting of the warning light 86.

It should be appreciated, that although the first detector 48 is depicted as being in series with the connectors which attach to the ring line 12, that this first detector 48 could also be in series with the tip line 14.

It should also be appreciated that in the preferred embodiment, the filter 64 will only be switched across the ring and tip lines 12,14, when a dialing attempt is being made from an illegal telephone unit 36. When the device 22 is attached between the authorized telephone units 18,20 and the central office 10 of a telephone system, the device 22 will be transparent to signals along the telephone lines under all conditions, except when a dialing attempt is being made from an illegal telephone unit 36. Also, when a dialing attempt is being made from an illegal telephone unit 36, the filter 64 which is connected across the ring and tip lines 12,14 will not generate an offensive signal, such as a square wave, nor will it short the lines which may be interpreted by the central office 10 as indicative of a problem along the lines. Furthermore, the device 22 will not cause the filter 64 to be connected across the lines 12,14 while the lines are being routinely tested from the telephone central office because such testing does not result in signals detectable by the third detector 56 or the pulse dialing detector 77.

Therefore, there is described a device which will prevent the initiation of a telephone call from an illegal telephone 36 positioned between the device 22 and the central office 10 of a telephone system. As can be seen, the device 22 will protect against invasion by an illegal telephone unit 36 whether it is positioned before or after the interface 16. Furthermore, the device 22 will be transparent to dialing efforts made from authorized telephone units 18,20, and calls can be placed from such authorized units without first inserting codes or the like to deactivate the device 22.

While the present invention has been described in connection with a single embodiment, it will be appreciated by those skilled in the art that many changes may be made without departing from the true spirit and scope of the present invention. Therefore, it is intended by the appended claims to cover all such changes and modifications which come within the true spirit and scope of the invention.

I claim:

1. A telephone protection device for attachment between the ring and tip lines from an off premises telephone central office and the ring and tip lines to an authorized telephone unit, the device comprising in combination, first attachment means for connecting said device to a ring line from a telephone central office, second attachment means for connecting said device to a tip line from a telephone central office, third attachment means for connecting said device to a ring line of an authorized telephone unit, fourth attachment means for connecting said device to a tip line of an authorized telephone unit, first detection means in series with one of said first and said third attachment means and said second and said fourth attachment means for detecting DC current passing there through, second detection means connected between said first attachment means and said second attachment means for detecting a change in voltage across said first attachment means and said second attachment means, dialing blocking means, switch means for selectively electrically connecting and disconnecting said dialing blocking means between said first attachment means and said second attachment means and, logic means responsive to said first detection means and said second detection means and connected to said switch means for connecting said dialing blocking means between said first and second attachment means when said first detection means does not detect a DC current and said second detection means detects a drop in voltage across the first and second attachment means to protect against the transmission of a dialing from a telephone unit positioned between said device and a central office.

2. A telephone protection device in accordance with claim 1 and further comprising clock means for controlling said switch means to alternatively connect and disconnect said dialing blocking means between said first and second attachment means.

3. A telephone protection device in accordance with claim 1 wherein said dialing blocking means comprises a pulse dialing blocking means.

4. A telephone protection device in accordance with claim 1 wherein said dialing blocking means comprises a dual tone multi-frequency dialing blocking means.

5. A telephone protection device in accordance with claim 1 wherein said dialing blocking means comprises a low pass filter.

6. A telephone protection device in accordance with claim 1 wherein said dialing blocking means comprises a resistor and a capacitor in parallel.

7. A telephone protection device in accordance with claim 2 wherein said clock means provides for the connection of said dialing blocking means between said first connecting means and said second connecting means for intervals of about one half second.

8. A telephone protection device for attachment between the ring and tip lines from an off premises telephone central office and the ring and tip lines to an authorized telephone unit, the device comprising in combination, first attachment means for connecting said device to a ring line from a telephone central office, second attachment means for connecting said device to a tip line from a telephone central office, third attachment means for connecting said device to a ring line of an authorized telephone unit, fourth attachment means for connecting said device to a tip line of an authorized telephone unit, first detection means in series with one of said first and said third attachment means and said second and said fourth attachment means for detecting a DC current passing there through, second detection means connected between said first attachment means and said second attachment means for detecting a change in voltage across said first attachment means and said second attachment means, third detection means connected between said first connection means and said second detection means for detecting dual tone multi-frequency dialing tone, pulse dialing detection means connected between said first and said second connection means for detecting a pulse dialing, pulse dialing blocking means, dual tone multi-frequency dialing blocking means, switch means for selectively electrically connecting and disconnecting said pulse dialing blocking means and said dual tone multi-frequency dialing blocking means between said first attachment means, and said second attachment means and, logic means responsive to said first detection means, said second detection means, said third detection means and said pulse dialing detection means and connected to said switch means for connecting both said pulse dialing blocking means and said dual tone multi-frequency dialing blocking means between said first and second attachment means when said first detection means does not detect a DC current, said second detection means detects a drop in voltage across said first and said second attachment means, and either said third detection means detects a dual tone multi-frequency dialing or said pulse dialing detection means detects a pulse dialing.

9. A telephone protection device in accordance with claim 8 wherein said pulse dialing blocking means comprises a resistor connected between said first attachment means and said second attachment means.

10. A telephone protection device in accordance with claim 8 wherein said dual tone multi-frequency dialing blocking means comprises a capacitor connected between said first attachment means and said second attachment means.

11. A telephone protection device in accordance with claim 8 wherein said pulse dialing blocking means and said dual tone multi-frequency dialing blocking means comprises a low pass filter connected between said first attachment means and said second attachment means.

12. A telephone protection device in accordance with claim 8 and further comprising clock means for controlling said switch means to alternately connect and disconnect both said pulse dialing blocking means and said dual tone multi-frequency dialing blocking means between said first connecting means and said second connecting means.

13. A telephone protection device in accordance with claim 12 wherein said clock means provides for the connection of both said dialing blocking means between said first connecting means and said second connecting means for intervals of about one half second.

14. A method of protecting a telephone line comprising a ring line and a tip line extending from a telephone company central office to one or more authorized telephone units comprising the steps of detecting a reduction in voltage between said ring line and said tip line which is indicative that a telephone unit connected to said ring line and said tip line is in use, detecting that current is not flowing through any one of the authorized telephone units, and connecting a dialing blocking means between said ring line and said tip line while said voltage between said ring line and said tip line is reduced and while no current is flowing to any one of the authorized telephone units for blocking the dialing of an unauthorized telephone unit.

\* \* \* \* \*